INVENTORS
GEORGE AGINS
CHARLES D. BOCK
RICHARD Y. MINER
BY
ATTORNEYS

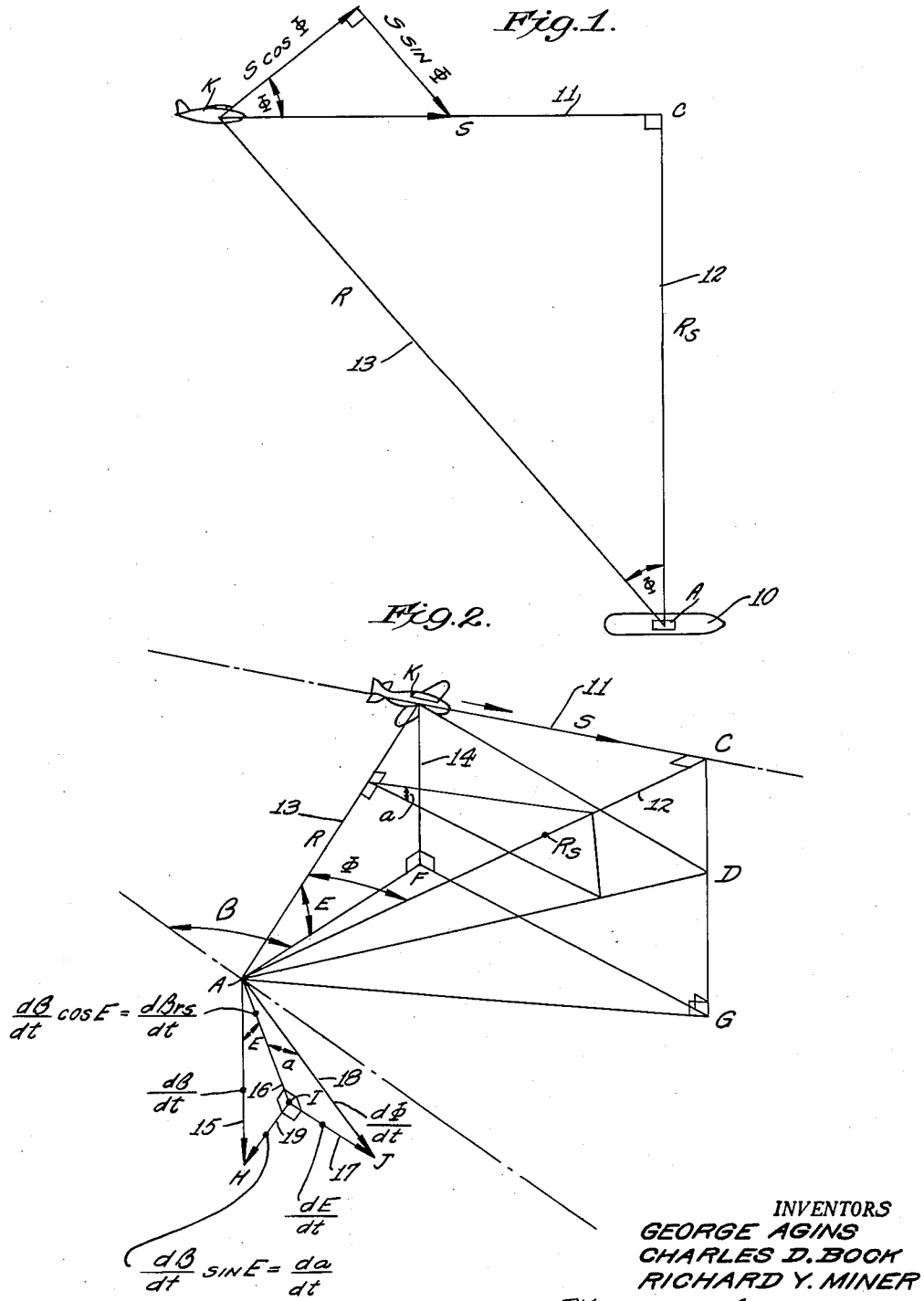

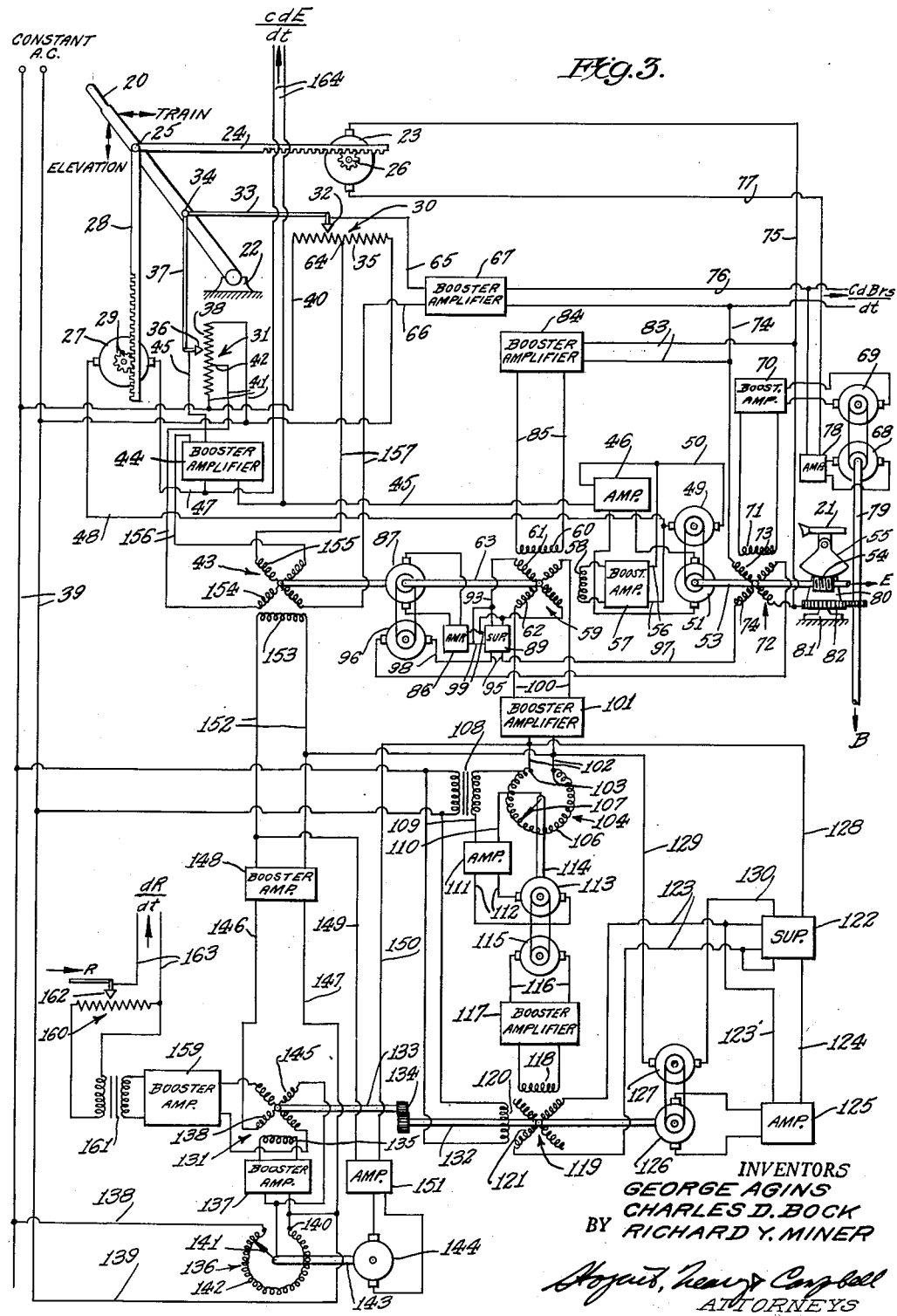

United States Patent Office 3,007,634
Patented Nov. 7, 1961

3,007,634
RATE COMPUTER FOR GUN CONTROL SYSTEMS
George Agins, Brooklyn, and Charles D. Bock and Richard Y. Miner, New York, N.Y., assignors to American Bosch Arma Corporation
Filed Apr. 18, 1944, Ser. No. 531,562
11 Claims. (Cl. 235—61.5)

This invention relates to calculating apparatus and has particular reference to a computer for use in gun fire control directors for continuously automatically calculating the angular rates and the range rate of movement of a target during an interval of time after an observation, the calculation being predicated on the assumption that the target travels along a rectilinear path at constant speed, after an initial observation of angular rates.

The input quantities which may be used as a basis for making the calculations in the computer of this invention are the observed angular rates of movement of the target during a short interval of time and one accurate range during the period in which the target maintains its initial speed and direction.

The principle of the solution of the rate computer of this invention is based on the right triangle lying in the plane of reference containing both the line of sight to the target from the point of observation, such as the director on a ship, and the observed path of the target, such as an airplane. The typotenuse of this triangle is in the line of sight and constitutes present target range at any instant. The line from the observation point intersecting the path of the target at right angles, that is, the minimum range to the target path, is the adjacent side, and the angle between these two lines is the angle which we shall designate $\phi$ and call "co-target angle." This minimum range and the speed of the target along its path opposite the co-target angle in the plane of reference, we have assumed to be constant. If the rate of change of the co-target angle is obtained in terms of these constants, i.e., target speed and minimum range, the change in co-target angle can be shown to be independent of the actual values of either of these unknown constants, and the present invention is predicated on this unique theory.

For a more complete understanding of the invention, reference may be had to the accompanying drawings, in which:

FIGURE 1 illustrates the right triangle lying in the plane including the line of sight to the target and the line of flight of the target, on which the principle of the invention is based;

FIG. 2 illustrates diagrammatically the three-dimensional relation of the right triangle to the horizontal and vertical planes passing through the point of observation and the line of flight of the target, respectively;

FIG. 3 is a schematic diagram of the computer of this invention; and

Figure 4:
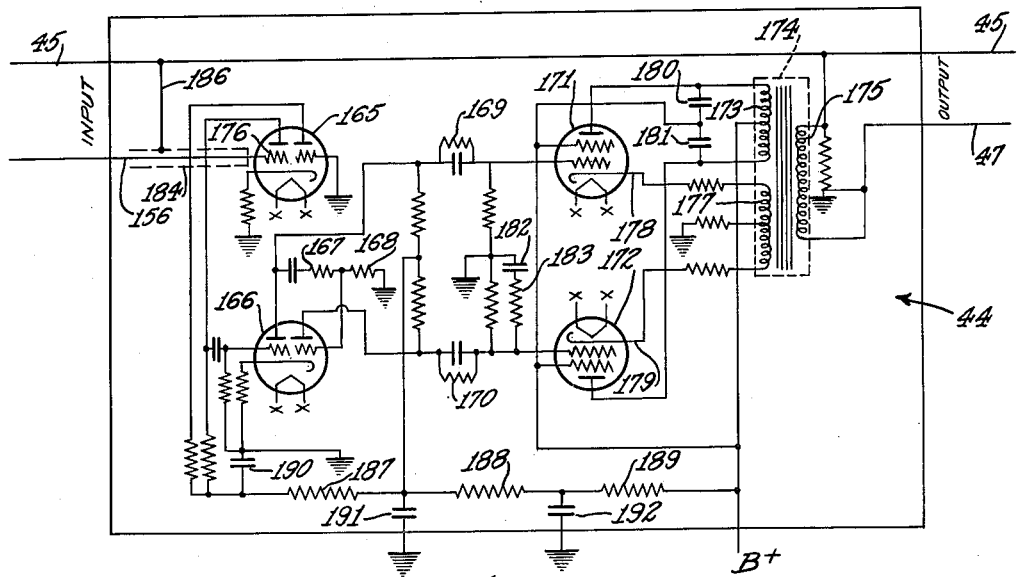
FIGS. 4 and 5 are diagrams of the booster amplifier and suppressor units employed in the computer, respectively.

Referring to FIG. 1, numeral 10 designates a mount having as the observation point the director A operating with the computer of this invention. The target K may be an airplane, moving along a rectilinear path 11 at constant speed, illustrated by the vector S. The length of the line 12 from the director A and intersecting the target path 11 at right angles at C represents the minimum range, R$s$, to the target path. The length of the hypotenuse 13 of the right triangle, in the line of sight from the director observation point A to the target K, represents the present range R to the target K at the observation instant. The angle $\phi$ between 12 (R$s$) and 13 (R) represents the aforementioned co-target angle. The plane containing the right triangle just described, and which plane contains both the line of sight 13 (R) from the observation point A to the target K and the line of flight 11 of the target K, is referred to herein as the $\phi$ co-target plane.

It will be observed that there are two constants in the right triangle of FIG. 1, viz., vector S, the speed of the target measured along the path of the target, and R$s$, the minimum range, and hence their quotient $S/Rs$ is also constant. When the rate of change of the angle $\phi$ is obtained in terms of this constant quotient $S/Rs$, it follows that the rate of change of the angle $\phi$ is independent of the actual values of either S or R$s$, but a function of their ratio.

Furthermore, it will be evident that for a given ratio $S/Rs$, every value of the co-target angle $\phi$ has, associated with it, an unique combination of co-target angle rate with co-target angle acceleration. This being the case, it is obvious that when these values are known subsequent values of $\phi$ can be readily calculated. Thus a director embodying this principle can track a target accurately during a long period; and this, in spite of the fact that the rate of change of angle $\phi$ varies progressively as the angle $\phi$ varies due to rapid change of range. In other words, at any instant, the ratio $S/Rs$ being fixed, the angular rate and acceleration of the angle $\phi$ determines its value.

The component of the target speed, S, perpendicular to the present range R, is S cos $\phi$. It then follows that:

(1) $$\frac{d\phi}{dt}=\frac{S\cos\phi}{R}=\frac{S}{R_s}\cos^2\phi=\frac{S}{2Rs}+\frac{S}{2Rs}\cos 2\phi$$

Differentiating the equation, $$\frac{d\phi}{dt}=\frac{S}{R_s}\cos^2\phi$$

results in (2) $$\frac{d^2\phi}{dt^2}=-\frac{2S}{Rs}\cos\phi\sin\phi\cdot\frac{d\phi}{dt}=-\frac{S}{Rs}\sin 2\phi\cdot\frac{d\phi}{dt}$$

Dividing the equation, $$\frac{d^2\phi}{dt^2}=-\frac{2S}{Rs}\cos\phi\sin\phi\cdot\frac{d\phi}{dt}$$

by equation, $$\frac{d\phi}{dt}=\frac{S}{R_s}\cos^2\phi$$

squared, results in (3)
$$\frac{\dfrac{d^2\phi}{dt^2}}{\left(\dfrac{d\phi}{dt}\right)^2}=\frac{-\dfrac{2S}{Rs}\cos\phi\sin\phi\dfrac{d\phi}{dt}}{\left(\dfrac{S}{Rs}\cos^2\phi\right)^2}=-2\tan\phi=-\frac{d}{dt}\left(\dfrac{1}{\dfrac{d\phi}{dt}}\right)$$

As above stated, at any instant, there can be only one value of $$\frac{d\phi}{dt}\text{ and }\frac{d^2\phi}{dt^2}$$

for a given value of $$\frac{S}{Rs}\text{ and }\phi$$

Consequently, if the values of $$\frac{d\phi}{dt},\frac{d^2\phi}{dt^2},\text{ and }\frac{S}{Rs}$$

can be obtained from observation of the motion of a target, the angle $\phi$ can be determined by means of the foregoing equations, and the values of $d\phi/dt$ can be calculated continuously by electro-mechanical regeneration, as will be described. Also, the range rate $dR/dt$ can be calculated by the introduction of one more observation, range.

In order to apply the changing value of $d\phi/dt$ to the optical system of the director A, it is necessary to express the rate in the $\phi$ plane in terms of rates in the horizontal and the vertical planes, and the physical relationship of the $\phi$ plane of FIG. 1 to the horizontal and vertical planes is shown diagrammatically in FIG. 2, where the $\phi$ plane containing the target paths and the observer at director A is shown as a triangle AKC. The horizontal plane is shown as a triangle AFG, and the vertical plane is shown as a triangle AKF, the side 13 (AK) being the present range R, the vertical side 14 (KF) being the altitude of the target K, and the vertical angle E being the elevation angle of the target K.

Considering the target K to be moving in the direction indicated, along line 11, the angular rate of train in the horizontal plane AFG due to the motion of the target K may be represented by a vector $dB/dt$ designated 15 in FIG. 2 and extending vertically downwardly, perpendicular to the horizontal plane AFG at the director A.

If a triangle, AKD, is drawn to represent a plane elevated from the horizontal through a dihedral angle equal to the elevation angle E, the line KD will be parallel to the line FG and the component of rotation in this intermediate plane AKD due to the rate $dB/dt$ will be $$\frac{dB}{dt} \cos E$$

and is represented as a vector, $dBrs/dt$, perpendicular to the intermediate plane AKD at point A. This vector is designated 16 in FIG. 2 and is shown as extending downwardly from intermediate plane AKD, at the angle E relatively to vector $dB/dt$ (15). A third vector, $dE/dt$, extending perpendicular to the vertical plane containing the vectors $$\frac{dB}{dt} \text{ and } \frac{dBrs}{dt}$$

is designated 17 in FIG. 2, and represents the angular rate of change of the elevation of the line of sight 13.

The resultant of the vectors $$\frac{dBrs}{dt} \text{ and } \frac{dE}{dt}$$

designated 16 and 17, is a fourth vector $d\phi/dt$ which is designated 18 in FIG. 2 and which extends perpendicular to the $\phi$ plane, AKC, and represents the angular rate of change of the deflection angle $\phi$. The angle alpha, $\phi$, between the vectors $d\phi/dt$ (18) and $dBrs/dt$ (16) is the angle between the $\phi$ plane AKC and the intermediate plane AKD and is measured in a plane perpendicular to the line of sight 13 and may be called apparent target inclination angle. The third side of this right triangle, 19, which equals $$\frac{dB}{dt} \sin E$$

also represents the vector for the angular rate $d\alpha/dt$, so that $$\frac{d\alpha}{dt} = \frac{dB}{dt} \sin E$$

as indicated in FIG. 2.

Solution of the foregoing problems procures some of the desired values to be used in further calculations whose results enable one to lay the gun or guns on the future position of target K so that the projectile or projectiles strike the target K at a point in its path along line 11. These desired values are horizontal bearing angle B, the sight elevation angle E, the angular elevation rate $dE/dt$ (vector 17), the angular slant bearing rate $dBrs/dt$ (vector 16), and the rate of change of range $dR/dt$.

These values are obtained from electro-mechanical mechanism shown schematically in FIG. 3, for measuring and continuously computing the rates and position of the target with respect to the vertical and horizontal planes and a fixed azimuth line, the outputs being the aforementioned horizontal bearing, B; sight elevation, E; angular elevation rate, $dE/dt$; the angular slant bearing rate, $dBrs/dt$; and the range rate $dR/dt$.

The director A is adapted to be operated by two men, a pointer-trainer who keeps the line of sight 13 on the target K, and a range-finder operator who measures range R by means of the usual optical range-finder, echo or reflection range-finder, or other means. The pointer-trainer actuates the control lever 20 to cause the telescope 21 or other sighting device, either on the director or associated therewith, to follow the target in elevation and train through intervening mechanism to be described. The control lever 20 is mounted in a universal socket 22 so as to be freely movable in all directions, similarly to an airplane control lever or joystick. When control lever 20 is moved in one general direction, such as backward and forward, the movement represents a movement in elevation, and a right or left sidewise movement of lever 20 represents movement in train. Of course, when the lever is moved diagonally, the movement is jointly in elevation and train. For purposes of illustration, movement of control lever 20 is indicated as in train when moved horizontally in the plane of the drawing and in elevation when moved vertically in the plane of the drawing.

Control lever 20 drives an A.C. generator 23 when moved in train, the mechanical connection between them being here illustrated as comprising rack 24 pivoted on lever 20 at 25 and engaging a pinion 26 on the armature shaft of generator 23. Similarly, when control lever 20 is moved in elevation, it drives A.C. generator 27 by means of rack 28 pivoted thereon at 25 and engaging pinion 29 on the armature shaft. In the interest of simplification, the field windings of generators 23 and 27 are not shown in FIG. 3, nor are those of other generators and motors to be described, but it will be understood that they are provided and are energized from usual sources. The generators 23 and 27 are used to give the pointer-training a control of the position of the line of sight, i.e., a feeling of direct coupling between his control lever 20 and the line of sight. In addition to this feeling of coupling between the control lever 20 and the sight, which facilitates the accuracy of following that is so necessary to smooth and accurate predictions, there is another important advantage in the use of the generators 23 and 27 in assuring accurate calculations as the target rate changes because of being angular rather than linear rate. That is, the tendency of the responsive mechanism to lag due to the damping which is necessary to provide a smooth rate output is neutralized by feeding into its control circuits a voltage greater than the rate voltage developed by the control lever-operated potentiometers 30 and 31 to be described. This additional voltage is a function of the rate of change of the control lever rate, which becomes large when the operator becomes aware of a deviation. In this way this extra voltage only appears during a change of rate evidenced by a repositioning of the control lever in order to keep on the target. Thus by the use of these generators 23 and 27, quick changes in target rate cause equally quick changes in calculated rates.

However, actual control of the telescope 21 in elevation and train is effected by potentiometers 30 and 31, the former being the train control potentiometer and the latter the elevation control potentiometer. The brush 32 of potentiometer 30 is connected by link 33 to pivot 34 on control lever 20 and moves along resistance 35 when lever 20 is moved in train. Similarly, brush 36 is connected by link 37 to pivot 34 on lever 20 and moves along resistance 38 as lever 20 is moved in elevation. Both potentiometers 30 and 31 are energized from constant A.C. source 39, the former being connected thereto by wires 40 and the latter by wires 41.

Considering the electro-mechanical system for operation in elevation first, movement of control level 20 in elevation adjusts brush 36 of potentiometer 31 along resistance 38 to produce a voltage output of $jdE/dt$ across brush 36 and center tap 42 which is a rate correction voltage which corrects the rate $dE/dt$. This output voltage of potentiometer 31, as modified by the output voltage from electric resolver 43 to be described, is fed to booster amplifier 44, which supplies power to a load at a voltage which is available from a high impedance source which could not itself supply the power without being affected by the load.

Booster amplifier 44 is illustrated in FIG. 4 and comprises a twin triode amplifier tube 165, on one of whose grids 176 the modified signal voltage from potentiometer 31 is impressed, and the amplified voltage fed into twin triode tube 166, acting as a phase inverter through resistance coupling. Owing to resistances 167 and 168, the two signals on the plate circuit of tube 166 are 180° out of phase and are fed through low-frequency stabilizing semi-direct couplings 169 and 170 to push-pull amplifier having beam power tubes 171 and 172, whose output is fed into primary 173 of output transformer 174. Inverse voltage feed-back is obtained by feeding the voltage from secondary 175 of output transformer 174 back to input grid 176 of twin triode 165, as shown. The inverse voltage feed-back obtained by feeding the voltage from secondary 177 to the cathodes 178 and 179 of tubes 171 and 172 lowers the amplifier output impedance by reducing the plate impedance. Condensers 180 and 181 across primary 173, and condenser 182 and resistor 183 on the output of the third stage, substantially eliminate high frequency oscillation, which is further avoided by connecting the input circuit shield 184 to common input-output lead 45 by wire 186. The hum level at zero voltage is minimized by filter networks in the plate circuits of twin triodes 165 and 166, and include resistors 187, 188 and 189 and condensers 190, 191 and 192. The booster amplifier 44 so constructed operates over a signal voltage range of 200 to 1 with great accuracy and its generated output may be distinguished herein from the observed output of potentiometer 31 by the prefix c, i.e. $cdE/dt$, one of the outputs whose taps are designated 164 in FIG. 3.

One output wire 45 from booster amplifier 44 is connected to the input of amplifier 46, which is of the conventional high gain electronic type, and the other output wire 47 is connected to one brush of generator 27 whose other brush is connected by wire 48 to one of the brushes of generator 49, whose other brush is connected by wire 50 to the other input terminal of amplifier 46. The input to amplifier 46 accordingly is the difference between the output voltages of booster amplifier 44 and generator 49 modified by the output of generator 27. Amplifier 46 energizes motor 51, which drives generator 49 at a speed which produces a voltage output of generator 49 which is equal to the value of $dE/dt$ coming from booster amplifier 44. Thus, if the $dE/dt$ voltage is proportional to the actual elevation rate of the target K, the mechanical displacement of the motor 51 is proportional to the target elevation angle E. Motor 51 accordingly is used to elevate the line of sight 13 in the vertical plane and to this end the shaft 53 of motor 51 may be connected by worm 54 to the arc 55 of telescope 21, so that the latter is adjusted in elevation by motor 51 in accordance with changes in elevation of the target K. The shaft 53 or its extension may operate an indicator for indicating elevation data, or to elevate a gun or guns directly, after usual corrections through follow-ups.

If the control lever 20 is in motion in elevation, the elevation generator 27 driven thereby develops a voltage which is added to the output of generator 49, by wires 47 and 48. Inasmuch as the output of generator 49 is proportional to the speed at which it is driven by motor 51, the increased voltage output thereof due to the increased voltage supplied by motor 51 by reason of the added voltage from generator 27, causes voltage output of generator 49 to further match the voltage output of generator 27 whenever the control lever 20 is in motion in elevation. Accordingly, the aforementioned effect of direct coupling between the control lever 20 and the line of sight is obtained by this arrangement.

The output voltage of generator 49, $dE/dt$, is also fed by lines 56 to boosted amplifier 57, similar to 44 as illustrated in FIG. 4. The output of booster amplifier 57 is supplied to stator coil 58 of induction resolver 59, adapted to electrically resolve trigonometric functions for varying angles and radii inputs. It comprises the two stator coils or primary windings 58 and 60 mounted in space quadrature, and a rotor comprising two independent coils or secondary windings 61 and 62 mounted in space quadrature on rotatable shaft 63. When the rotor shaft 63 is rotated through an angle and one of the stator coils is energized at a value corresponding to a radius, the mutual inductance between that stator coil and rotor coils or secondary windings, produces an alternating current voltage across the terminals of the rotor coils proportional to the product of the radius input and a function of the angle through which shaft 63 was rotated, the output of one rotor coil corresponding to the sine of the angle and the output of the other rotor coil corresponding to the cosine of the angle, for example. Accordingly, by use of the induction resolver 59, one of the triangles shown in FIG. 2 may be solved. The radius input of $dE/dt$ supplied to stator coil 58 accordingly sets up one side, 17, of the vector triangle AIJ in FIG. 2. The remainder of the function of induction resolver 59 will be described later.

The train mechanism is coordinated with the elevation mechanism and is placed into operation by movement of control lever 20 in train, which causes brush 32 of potentiometer 30 to be adjusted along resistance 35, and generator 23 to be rotated as previously described. The voltage output of potentiometer 30 across brush 32 and center tap 64 is $jBrs/dt$ which is a rate correction voltage which corrects the observed slant bearing rate $dBrs/dt$. This output voltage, as modified by the output voltage from one of the rotor coils of induction resolver 43 which is to be described, is supplied by wires 65 and 66 to booster amplifier 67, similar to booster amplifier 44 as illustrated by FIG. 4. The output of train generator 23 is a transient voltage and is added to the output of booster amplifier 67. Matching the sum of these voltages is a circuit consisting of the motor 68 driving a generator 69 whose output is fed to booster amplifier 70, similar to booster amplifier 44 as illustrated in FIG. 4, the output terminals of which are connected to stator coil 71 of induction resolver 72, which is like resolver 59 previously described. The rotor of resolver 72 comprising coils 73 and 74 is rotated through the angle E by shaft 53 of elevation motor 51. The output of rotor coil 73 of resolver 72 is used to match the rate voltages from booster amplifier 67 and generator 23, being connected to one terminal of each by the wires 74' and 75. The difference between this total rate voltage from 23 and 67 and the voltage output of resolver rotor coil 73 is supplied by wires 76 and 77 to amplifier 78 for controlling motor 68. Amplifier 78 is a conventional electronic type similar to amplifier 46 previously described.

The output of generator 69 is the train rate in the horizontal plane $dB/dt$ (vector 15 in FIG. 2), and as this value is radius input to coil 71 of resolver 72, the output of rotor coil 73, rotated through angle E, is $$\frac{dB}{dt} \cos E$$

However, as the value of $$\frac{dB}{dt} \cos E \text{ equals } \frac{dBrs}{dt}$$

as indicated in FIG. 2, the voltage output of resolver 72 rotor coil 73 equals the output of booster amplifier 67, and the circuit balances. When this balance occurs, the mechanical output of motor 68 is change of train angle in the horizontal plane, B, and the shaft 79 of motor 68 rotates the support 80 of sight 21 in azimuth through the angle B. The sight support 80 is journalled on a suitable base 81 and is connected by gearing 82 to the shaft 79.

The output voltage, $dBrs/dt$, of resolver 72 is also supplied by wires 74′, 75 and 83 to booster amplifier 84, similar to 44 as illustrated by FIG. 4, whose output terminals 85 are connected to the remaining stator coil 60 of resolver 59, thus setting up the $dBrs/dt$ (16) side of the triangle AIJ in FIG. 2. Inasmuch as the adjacent side of this triangle $dE/dt$ (17) is set up by proportional voltage applied to stator winding 58, as previously described, both energized stator windings 58 and 60 produce a resultant flux voltage which induces voltages in both windings 61 and 62 of the rotor. When the rotor is positioned correctly, the voltage induced in one coil of the rotor is the resultant rate vector $d\phi/dt$ (18 in FIG. 2), and the voltage induced in the other coil of the rotor is zero, while the angular displacement of the rotor is $\alpha$. The correct positioning of rotor is initiated by induction of voltage in rotor null winding 61 which is amplified by amplifier 86, similar to amplifiers 46 and 78, and impressed on motor 87, whose shaft 63 carries rotor coils 61 and 62. The motor 87 accordingly revolves the rotor in the proper direction to reduce to zero the voltage induced in null winding 61, whereupon the motor 87 deenergizes itself and comes to rest after having rotated the rotor through angle $\alpha$, indicated in FIG. 2.

Figure 5:
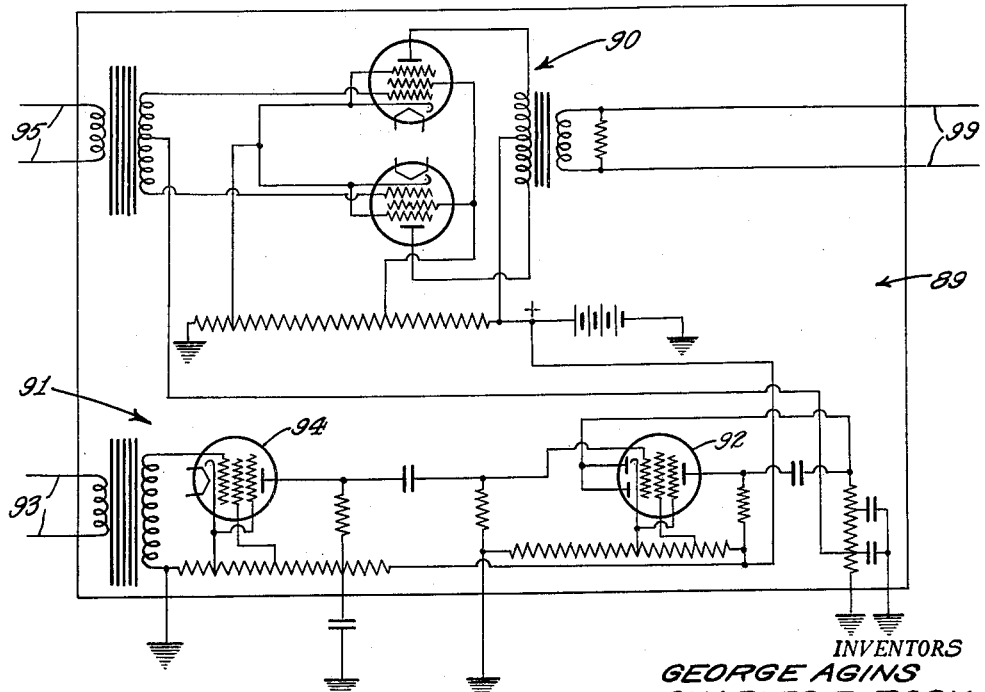

In order to improve the dynamics of the system, a voltage proportional to the rate of change of the angle $\alpha$, i.e. $d\alpha/dt$, is added to aid in keeping the rotor of resolver 59 in step as the angle $\alpha$ changes. This added voltage is supplied by suppressor unit 89 to which the voltage induced in null or synchronizing rotor winding 61 is supplied. The suppressor 89 is illustrated in FIG. 5 and includes two voltage amplifiers 90 and 91 and a rectifier 92. The synchronizing signal from rotor coil 61 is impressed on input terminals 93 to be amplified by amplifier 91, which includes a pentode 94. The output voltage of amplifier 91 is rectified by rectifier 92, whose output is applied to the grids of amplifier 90 as bias voltage. Amplifier 90, containing two pentodes, amplifies the voltage impressed on the input terminals 95, which comprises the voltage difference between the $d\alpha/dt$ voltage induced in rotor coil 74 of resolver 72 and the output voltage $d\alpha/dt$ of the generator 96 driven by motor 87, which voltages are supplied by wires 97 and 98 to the aforementioned terminals 95 of suppressor 89. The output terminals 99 are connected to amplifier 86 for energizing the motor 87, as described.

An increase in the synchronism voltage from rotor coil 61 causes the grid bias voltage of amplifier 90 to become more negative and results in less output. Since the output voltage of the suppressor imposes a damping factor on the synchronized voltage induced in coil 61, there is a corresponding proportional decrease in the damping effect for increases in the synchronizing voltage. Inasmuch as the damping effect thus decreases with an increase in synchronizing voltage, the speed of the motor 87 is increased at proportionately higher rates for increases in synchronizing voltage. Therefore the rotor coil 61 of resolver 59 will be diven to zero position in less time than it would if the suppressor 89 were not in the amplifier circuit. The suppressor 89 suppresses the effect of the $d\alpha/dt$ difference voltage on amplifier 86 when the rotor of resolver 59 is out of synchronism, i.e. when the voltage induced in synchronizing coil 61 is not zero. This allows the rotor to be synchronized rapidly when it is out of step and cuts out the strong damping characteristics of generator 96. When rotor coil 61 voltage is zero, the $d\alpha/dt$ difference voltage passes through the suppressor unit 89 without change and assumes complete control of motor 87 through amplifier 86.

The aforementioned voltage output of rotor coil 62 which is proportional to the value of the observed angular rate in the $\phi$ plane, viz. $d\phi/dt$, is supplied by wires 100 to booster amplifier 101, which is constructed and operates like booster amplifier 44 shown in FIG. 4. The output of booster amplifier 101 is supplied by wires 102 to the terminals 103 of potentiometer 104, to energize the same. Potentiometer 104 consists essentially of a non-inductive ring over which is evenly wound a helix 106 of constant cross-section wire. A movable brush 107 engages the helix 106 and its position relatively to one of the taps 103 determines the voltage output of the potentiometer 104, which is always proportional to the angular displacement of the brush 107 from one of said taps 103, as will be readily understood.

The output voltage of potentiometer 104 is matched against constant A.C. voltage from source 39 through an iron core transformer 108, which has the effect of inverting the rate $d\phi/dt$, and the voltage difference fed by wires 109 and 110 to a modifier 111, which is a conventional electronic type similar to amplifiers 46, 78 and 86. The output of amplifier 111 is impressed by wires 112 on the motor 113 whose displacement is proportional to $$\frac{1}{\frac{d\phi}{dt}}$$

when motor 113 ceases to receive current. The shaft 114 of motor 113 drives brush 107 of potentiometer 104 to such position that the input voltage applied to amplifier 111 becomes zero and the motor 113 is accordingly deenergized and stops.

Motor 113 also drives generator 115, and since the displacement of motor 113 and consequently generator 115 is proportional to $$\frac{1}{\frac{d\phi}{dt}}$$

the voltage output of generator 115 is the derivative of $$\frac{1}{\frac{d\phi}{dt}}$$

and that is equal to $2 \tan \phi$, as is indicated by aforementioned Equation 3. This voltage is supplied by wires 116 through booster amplifier 117, similar to 44 as illustrated in FIG. 4, to the one stator coil 118 of induction regulator or resolver 119, constructed and operating like resolver 59. The other stator coil 120 is energized by constant unit A.C. voltage from source 39. The resultant flux vector produced by these two voltages impressed on stator coils 118 and 120 induces a voltage in null rotor coil 121 which is supplied to suppressor unit 122 by wires 123. Suppressor unit 122 is constructed and operates like suppressor unit 89 illustrated in FIG. 5. The voltage output of suppressor unit 122 plus the voltage output of the rotor null coil 121 of resolver 119 is supplied by wires 123′ and 124 to amplifier 125, which is like amplifiers 46, 78, 86 and 111, and controls motor 126, which rotates the rotor of resolver 119 until the voltage output of null coil 121 is zero. The motor 126 drives generator 127, the difference between whose output and the value $d\phi/dt$ from resolver 59 is fed through amplifier 125 to motor 126. The motor 126 thus rotates through an angle, $\phi$, and continues to generate the angle $\phi$ in accordance with the magnitude of the $d\phi/dt$ voltage from resolver 59. The voltage output of the generator 127 is also fed to suppressor unit 122, which functions the same as suppressor unit 89 previously described, i.e., to allow the rotor of resolver 119 to be synchronized rapidly when out of step and cut out the strong damping characteristics of generator 127. The connections between suppressor unit 122, generator 127 and resolver 59 securing the voltage difference described, are made by wires 100, 102, 128, 129 and 130.

Motor 126 also drives the rotor of induction resolver 131 through shafts 132 and 133, connected by gears 134 whose ratio is such that the rotor of resolver 131 is displaced through the angle $2\phi$. The stator winding 135 of resolver 131 is energized from potentiometer 136 through booster amplifier 137, which is constructed and operates like booster amplifier 44 illustrated in FIG. 4. The potentiometer 136 is constructed like potentiometer 104, except that it is non-linearly wound and is energized from constant A.C. source 39 by wires 138 and 139 connected to the two input taps 140, the output voltage being taken from one tap 140 and the brush or slider 141. The brush 141 is driven over winding 142 by the shaft 143 of motor 144. Stator coil 135 of resolver 131 is thus energized by a voltage proportional to $S/2Rs$ from potentiometer 136 and, as the rotor thereof is moved through the angle $2\phi$ as described, the voltage induced in rotor winding 145 is $$\frac{S}{2Rs} \cos 2\phi$$

which, when added to the output of potentiometer 136, equals $$\frac{S}{2Rs}(1 + \cos 2\phi) = \frac{cd\phi}{dt}$$

the prefix $c$ indicating a generatel value of $d\phi/dt$ as distinguished from an observed value. This equation is that designated (1) above. The addition of these voltages, effected in the wiring 146, 147, is fed to booster amplifier 148, which is like 44, illustrated in FIG. 4. The voltage difference between the $cd\phi/dt$ output of booster amplifier 148 and the $d\phi/dt$ voltage output of booster amplifier 101 is supplied by wires 149 and 150 through amplifier 151 to potentiometer motor 144, thus causing the brush 141 to be adjusted to adjust the output of potentiometer 136 until the $cd\phi/dt$ voltage output of booster amplifier 148 equals the $d\phi/dt$ voltage output of booster amplifier 101, at which point motor 144 becomes deenergized and stops.

The aforementioned $cd\phi/dt$ output of booster amplifier 148 is also supplied by wires 152 to stator coil 153 of resolver 43, whose rotor is revolved through angle $\alpha$ by the shaft 63 of motor 87, as previously described. Consequently the voltage induced in rotor coil 154 is $cdE/dt$ and that in rotor coil 155 is $cdBrs/dt$, which are generated values of vectors 17 and 16, respectively, as shown in FIG. 2. The $cdE/dt$ voltage output of rotor coil 154 of resolver 43 is added by wires 156 to the $dE/dt$ elevation circuit of control lever 20, and the $cdBrs/dt$ voltage output of rotor 155 of resolver 43 is added by wires 157 to the $dBrs/dt$ train circuit of control lever 20. The added generated voltages drive the telescope 21 of director A in elevation and train ahead of the target K, and thus cause the pointer-trainer to return control lever toward zero position in order to keep the line of sight 13 on the target K. Accordingly, the generated rates assume control of the control lever 20, and by regeneration the desired correct values of $S/Rs$, $\phi$ and $\alpha$ are established, from which the position of the line of sight 13 is continuously calculated and will cause the telescope 21 to follow the target K automatically with a minimum of attention on the part of the pointer-trainer.

In addition to the foregoing values, the range rate, $dR/dt$, is required, in order to fire at the target K. Referring to the $\phi$ triangle shown in FIG. 1, it will be seen that $$\frac{dR}{dt} = S \sin \phi = R \frac{S}{2Rs} \sin 2\phi$$

It will also be recalled that the voltage output of rotor coil 145 of resolver 131 is $$\frac{S}{2Rs} \cos 2\phi$$

and that, since the other rotor coil 138 is positioned in space quadrature thereto, its output voltage is $$\frac{S}{2Rs} \sin 2\phi$$

which is fed to booster amplifier 159, like 44 illustrated in FIG. 4. The output of booster amplifier 159 energizes potentiometer 160 through iron core transformer 161, and the brush 162 thereof is adjusted along the potentiometer 160 by the range-finder operator in accordance with present range, R, which is received from the range-finder, preferably automatically. The voltage output of potentiometer 160, across wires 163, is accordingly the product of input voltage $$\frac{S}{2Rs} \sin 2\phi$$

from resolver 131, and R, and hence is proportional to $dR/dt$, the range rate.

The mechanism illustrated schematically in FIG. 3 accordingly provides mechanically the angular output of horizontal bearing, B, indicated in FIG. 2, by means of shaft 79; the sight elevation, E, indicated in FIG. 2, by means of shaft 53; generated voltage output of angular elevation rate, $dE/dt$, indicated by vector 17 in FIG. 2, by means of booster amplifier 44, from wires 164; voltage output of angular slant bearing rate, $dBrs/dt$, indicated by vector 16, from wires 74' and 76; which values are used for calculating data for the gun or guns.

Although the foregoing detailed description of the construction and operation of the rate computer of this invention suffices to constitute a complete disclosure thereof, a brief summary of its operation will be helpful in considering a typical incident of operation. Assuming that the target K is a bombing airplane, and that the computer is a part of an anti-aircraft gun fire control director mounted on a ship for bodily rotation in azimuth to lead the target in train, and with its telescope movable in elevation. The pointer-trainer manipulates control lever 20 backward or forward and right or left until the target K is centered in the field of view of the telescope 21. Periodic adjustment of the control lever 20 may be necessary to keep the target in the field of view to compensate for changes in target elevation and train rates.

Movement of the control lever 20 in this fashion results in development of voltages $$\frac{jdE}{dt} \text{ and } \frac{jdBrs}{dt}$$

in respective elevation and train potentiometers 31 and 30.

Assuming, for simplification, that the $cdE/dt$ elevation voltage from resolver 43 is zero, the $jdE/dt$ voltage from potentiometer 31 is supplied to booster amplifier 44, whose output, plus any voltage from coupling generator 27 if the control lever is in motion, less the voltage output of generator 49, is applied to motor 51, which drives generator 49 at a speed which produces a voltage output equal to the value of $dE/dt$ coming from booster amplifier 44. Thus, if the $dE/dt$ voltage is proportional to the actual elevation rate of the target K in the vertical plane AKF, the displacement of motor 51 is proportional to target elevation angle E.

Accordingly, the telescopic sight 21 is driven through the angle E, being actuated by motor 51, and the crosshairs center on the target, since the generated rate $cdE/dt$ matches the observed rate $dE/dt$. If the elevation rate $dE/dt$ of the target K remains constant, motor 51 continues to drive the sight in elevation at the same rate. If the elevation rate of the target K changes, requiring the pointer-trainer to readjust control lever 20 in order to keep the telescope cross-hairs on the target K, this readjustment is reflected in the altered rate of movement of the motor 51, either a reduction or increase in its speed. Also, although the output of elevation generator 27 is cancelled by the output of generator 49 driven by elevation motor 51, for the overcoming of inertia as described above, it nevertheless gives the pointer-trainer a sense of direct coupling between his control lever and the line of sight 13 in elevation, thus making his control more positive although indirect. The output $dE/dt$, of generator 49 is also fed through booster amplifier 57 to one stator coil 58 of resolver 59 and thus sets up one side, 17, of the vector triangle shown in FIG. 2.

As aforementioned, the elevation angle E output of shaft 53 of motor 51 may be employed to elevate a gun or guns, with the usual corrections being introduced. Also the generated elevation rate, $cdE/dt$, output of booster amplifier 44 may be used as data for making the additional necessary corrections in elevation of the gun or guns, this output being available at wires 164.

In train, displacement of the control lever 20 generally to the right or left by the pointer-trainer adjusts brush 32 of potentiometer 30 accordingly, to yield a voltage $jdBrs/dt$, and also drives generator 23 to yield a change voltage, both voltages being applied in the slant plane AKD of FIG. 2 for convenience of lever 20 control of the line of sight 13. Assuming, for simplification, that the generated value of $cdBrs/dt$ coming from resolver 43 is zero, the $jdBrs/dt$ voltage from potentiometer 30 is fed through booster amplifier 67 and added to the voltage from generator 23 and the resulting generated output voltage $cdBrs/dt$, represented by vector 16 in FIG. 2, may be used as data for laying the gun or guns. The sum of these voltages is impressed on motor 68 which drives generator 69 whose output is fed through booster amplifier 70 to stator coil 71 of resolver 72 whose rotor is driven by target elevation motor 51. One rotor coil 73 of resolver 72 is used to match the rate voltages from booster amplifier 67 and generator 23. As a result, the output of generator 69 becomes train rate, $dB/dt$, in the horizontal plane AFG, and the outputs of resolver 72 become $dB/dt \cos E$ and $$\frac{dB}{dt} \sin E$$

However, since the value of $dB/dt \cos E$ is equal to $dBrs/dt$, indicated in FIG. 2, which is also the $dBrs/dt$ combined outputs of booster amplifier 67 and generator 23, the entire circuit balances. When this occurs, the mechanical output of motor 68 is train angle, B, in the horizontal plane AFG and hence motor 68 may be employed to train the sight 21 or the entire director A, as the case may be. Also the shaft 79 of motor 68 may be used to train the gun or guns, with usual interposed corrections. Thus the movement of control lever 20 in train automatically causes sight 21 to follow the target K in train. If its rate changes, the pointer-trainer adjusts lever 20 accordingly, and the generated rate $cdBrs/dt$ in the slant plane also changes accordingly.

The output voltage, $dBrs/dt$, from rotor coil 73 of resolver 72 is also fed through booster amplifier 84 to remaining stator coil 60 of resolver 59 to set up the $dBrs/dt$ side 16 of the triangle AIJ shown in FIG. 2, whose other side $dE/dt$ (17) was set up in stator coil 58. If the rotor of resolver 59 is positioned correctly, i.e. at the angle $\alpha$, the voltage output of rotor coil 62 is $d\phi/dt$, the other side 18 of the triangle AIJ shown in FIG. 2. As described in detail, the motor 87 rotates the rotor of resolver 59 until the voltage in synchronizing coil 61 is zero, which causes motor 87 to be deenergized and the position to which it moved is angle $\alpha$. Thus all elements of triangle AIJ are given.

When the value of the angle rate $d\phi/dt$ in the $\phi$ plane is supplied from rotor coil 62 of resolver 59 through booster amplifier 101 to potentiometer 104, the output thereof displaces motor 113 in accordance with the reciprocal of $$\frac{1}{\frac{d\phi}{dt}} \text{ or } \frac{\overline{d\phi}}{dt}$$

and motor 113 drives generator 115 accordingly, the voltage output thereof is the derivative of this reciprocal, or $2 \tan \phi$ (Formula 3), which is applied to stator winding 118 of resolver 119. Rotor coil 121 controls energization of motor 126 by the difference between the voltage $d\phi/dt$ from resolver 59 and the voltage from generator 127, so that motor 126 rotates through angle $\phi$ and continues to generate it in accordance with the magnitude of the $d\phi/dt$ voltage.

The rotor of resolver 131 is rotated through angle $2\phi$ through multiplying gearing 134 from $\phi$ motor 126, and its stator winding 135 is energized by voltage $S/2Rs$ through booster amplifier 137 from potentiometer 136 whose brush 141 is positioned by motor 144 which is energized by voltage difference between $$\frac{cd\phi}{dt} \text{ and } \frac{d\phi}{dt}$$

from respective booster amplifiers 101 and 148. The voltage induced in resolver rotor winding 145 therefore is $$\frac{S}{2Rs} \cos 2\phi$$

which, when added to the output of potentiometer 136 by wires 147, equals $$\frac{S}{2Rs}(1 + \cos 2\phi) = \frac{cd\phi}{dt}$$

as indicated by Equation 1 above. This generated $cd\phi/dt$ voltage applied to stator coil 153 of resolver 43 induces in the rotor coils, positioned at angle $\alpha$ by motor 87, voltages proportional to $$\frac{cdE}{dt} \text{ and } \frac{cdBrs}{dt}$$

which are added into the respective elevation and train circuits to cause the pointer-trainer to return control lever to zero position in order to keep the line of sight 13 on the target K. In this way the control lever 20 becomes merely a means for introducing subsequent corrections due to changes in the rate of motion of the target in elevation and train, the apparatus otherwise functioning automatically to produce correct generated values of $S/Rs$, $\phi$ and $\alpha$ as described. From these values the position of the line of sight 13 is calculated continuously and it will follow the target automatically.

In the meantime, the other operator, operating a range finder not shown, introduces present range by adjusting brush 162 of potentiometer 160, making such adjustments from time to time as are required by change in range of the target K. As described, potentiometer 160 is energized in accordance with $$\frac{S}{2Rs} \sin 2\phi$$

which, multiplied by R voltage, produces a time rate of change voltage equal to $dR/dt$, for use in laying the gun or guns.

Although a preferred embodiment of the invention has been illustrated and described herein, it is to be understood that the invention is not limited thereby, but is susceptible of changes in form and detail within the scope of the appended claims.

We claim:
1. In calculating apparatus for gun fire control systems, the combination of a movable member adapted to be driven to follow a moving target, manual means movable in accordance with movement of the target, means responsive to movement of said manual means for developing a voltage in accordance with said movement, second means responsive to movement of said manual means and independent of said first responsive means for developing a separate voltage, a motor responsive to the difference between said voltages, and driving connections between said motor and said member and independent of said manual means, whereby the member is moved to follow the target in accordance with differences between said voltages.

2. In a calculating apparatus for gun fire control systems, the combination of manual means movable in accordance with the movement of the target, means responsive to movement of said manual means in one direction for developing a voltage proportional to such movement, means responsive to movement of said manual means in another direction for developing a voltage proportional to such movement, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position, and means responsive to the voltage induced in said other rotor coil for generating a value as data for laying the gun.

3. In a calculating apparatus for gun fire control systems, the combination of manual means movable in accordance with the movement of the target, means responsive to movement of said manual means in one direction for developing a voltage proportional to such movement corresponding to the elevation of the target, means responsive to movement of said manual means in another direction for developing a voltage proportional to such movement corresponding to the bearing of the target, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position, the voltage induced in said other rotor coil being proportional to the angular rate of the target in a plane including the path of the target and the line of sight, and means responsive to said last-named voltage for generating a value in said plane as data for laying the gun.

4. In a calculating apparatus for gun fire control systems, the combination of manual means movable in accordance with the movement of the target, means responsive to movement of said manual means in one direction for developing a voltage proportional to such movement corresponding to the elevation of the target, means responsive to movement of said manual means in another direction for developing a voltage proportional to such movement corresponding to the bearing of the target, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position, and a second motor responsive to the voltage induced in the other rotor coil for rotating a degree proportional to the angle between the line of sight to the target and a line normal to the path of the target in a plane including the line of sight and the path of the target, said rotation constituting a value as data for laying the gun.

5. In a calcuating apparatus for anti-aircraft gun fire control systems, the combination of manual means movable in accordance with the movement of the target, means responsive to movement of said manual means in one direction for developing a voltage proportional to such movement corresponding to the elevation of the target as data for laying the guns, means responsive to movement of said manual means in another direction for developing a voltage proportional to such movement corresponding to the slant bearing of the target as data for laying the gun, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position, the voltage induced in said other rotor coil being proportional to the angular rate of the target in a slant plane including the path of the target and the line of sight, and means responsive to said last-named voltage for generating a value in said plane as data for laying the gun.

6. In a calculating apparatus for gun fire control systems, the combination of manual means movable in accordance with the movement of the target, means responsive to movement of said manual means in one direction for developing a voltage proportional to such movement corresponding to the elevation of the target, means responsive to movement of said manual means in another direction for developing a voltage proportional to such movement corresponding to the bearing of the target, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position, means responsive to the voltage induced in the other rotor coil for generating a voltage in accordance with the equation $$2 \tan \phi = \frac{d}{dt}\left(\frac{1}{\frac{d\phi}{dt}}\right)$$

in which $\phi$ is the co-target angle between the line of sight to the target and a line normal to the path of the target in a plane including the line of sight and the path of the target, and means responsive to said last-named voltage for generating a value in said plane as data for laying a gun.

7. In a calculating apparatus for anti-aircraft gun fire control systems, the combination of manual means movable in accordance with the movement of the target, means responsive to movement of said manual means in one direction for developing a voltage proportional to such movement corresponding to the observed elevation of the target, means responsive to movement of said manual means in another direction for developing a voltage proportional to such movement corresponding to the observed train of the target, an induction device including a pair of stator windings in space quadrature and a pair of rotor windings in space quadrature inductively associated with said stator windings, several connections between said responsive means and said stator windings for energizing the latter in accordance with said respective elevation and train voltages, a motor responsive to the voltage induced in one of said rotor coils, operative connections between said motor and said rotor for driving said one rotor coil to zero voltage-inducing position, a second induction device having a stator winding and a pair of rotor windings in space quadrature inductively associated with said stator winding, operative connections between the rotor of said second inductive device and said motor for driving the former, connections between the other rotor coil of said first induction device and the stator of said second device for impressing on the latter the voltage induced in the former, means in said last-named connections for modifying said induced voltage, and means for combining the voltages severally induced in the rotor windings of said second induction device with the corresponding observed rate voltages developed by said first-named two manually operated means, whereby the movement of said manual means is compensated in elevation and train.

8. In a calculating apparatus for anti-aircraft gun fire control systems, the combination of manual means movable in accordance with the movement of the target, means responsive to movement of said manual means in one direction for developing a voltage proportional to such movement corresponding to the observed elevation of the target, means responsive to movement of said manual means in another direction for developing a voltage proportional to such movement corresponding to the observed bearing of the target, a movable member adapted to be driven to follow the aerial target, motive means responsive to said elevation rate voltage for driving said member in elevation, motive means responsive to said bearing rate voltage for driving said member in train, an inductive device including a pair of stator windings in space quadrature and a pair of rotor windings in space quadrature inductively associated with said stator windings, several connections between said responsive means and said stator windings for energizing the latter in accordance with said respective elevation and train voltages, a motor responsive to the voltage induced in one of said rotor coils, operative connections between said motor and said rotor for driving said one rotor coil to zero voltage-inducing position, a second induction device having a stator winding and a pair of rotor windings in space quadrature inductively associated with said stator winding, operative connections between the rotor of said second inductive device and said motor for driving the former, connections between the other rotor coil of said first induction device and the stator of said second device for impressing on the latter the voltage induced in the former, means in said last-named connections for modifying said induced voltage, and means for adding the voltages severally induced in the rotor windings of said second induction device with the corresponding observed voltages developed by said first-named two manually operated means to thereby affect the positioning of said member and requiring the operator to return said manual means to zero position to maintain said member directed on the target.

9. In a calculating apparatus for gun fire control systems, the combination of manual means movable in accordance with the movement of the target, means responsive to movement of said manual means in one direction for developing a voltage proportional to such movement corresponding to the elevation of the target, means responsive to movement of said manual means in another direction for developing a voltage proportional to such movement corresponding to the bearing of the target, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position through the apparent target elevation angle α, a second motor at least partially responsive to the voltage induced in the other rotor coil for rotating a degree proportional to the angle φ between the line of sight to the target and a line normal to the path of the target in a plane including the line of sight and the path of the target, a second induction device including a stator winding and a pair of rotor windings in space quadrature, driving connections between said second motor and the rotor of said second induction device for rotating the same a degree proportional to said angle φ, means at least partially responsive to the voltage induced in the other rotor coil of said first induction device for energizing the stator coil of said second induction device, means movable in accordance with the change of range of the target, means responsive to movement of said range means for developing a voltage, means for combining the voltage induced in one of the rotor coils of said second induction device for producing a voltage proportional to the range rate, a third induction device including a stator winding and a pair of rotor windings in space quadrature, operative connections between said first motor and the rotor of said third induction device for rotating the latter through said angle α, connections between the other rotor coil of said second induction device and the stator coil of said third induction device for energizing the latter in accordance with the voltage induced in the former, and means for combining the voltages severally induced in the rotor windings of said third induction device with the corresponding respective voltages developed by said two first-named manually operated voltage means, whereby the movement of said member is modified independently of said manual means.

10. In a calculating apparatus for gun fire control systems, the combination of manual means movable in accordance with the movement of the target, means responsive to movement of said manual means in one direction for developing a voltage proportional to such movement corresponding to the elevation of the target, means responsive to movement of said manual means in another direction for developing a voltage proportional to such movement corresponding to the bearing of the target, a movable member adapted to be driven to follow a moving target, motive means responsive to said elevation rate voltage for driving said member in elevation, motive means responsive to said bearing rate voltage for driving said member in train, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position through the apparent target inclination angle α, a second motor at least partially responsive to the voltage induced in the other rotor coil for rotating a degree proportional to the angle φ between the line of sight to the target and a line normal to the path of the target in a plane including the line of sight and the path of the target, a second inducion device including a stator winding and a pair of rotor windings in space quadrature, driving connections between said second motor and the rotor of said second induction device for rotating the same a degree proportional to said angle φ, means at least partially responsive to the voltage induced in the other rotor coil of said first induction device for energizing the stator coil of said second induction device, means movable in accordance with the change of range of the target, means responsive to movement of said range means for developing a voltage, means for combining the voltage induced in one of the rotor coils of said second induction device for producing a voltage proportional to the range rate, a third induction device including a stator winding and a pair of rotor windings in space quadrature, operative connections between said first motor and the rotor of said third induction device for rotating the latter through said angle $\alpha$, connections between the other rotor coil of said second induction device and the stator coil of said third induction device for energizing the latter in accordance with the voltage induced in the former, and means for modifying the several voltages developed by the said two first-named manually operated voltage means in accordance with corrective voltages to thereby correct the direction of said member on the target.

11. In a calculating apparatus for gun fire control systems, the combination of manual means movable in accordance with the movement of the target, means responsive to movement of said manual means in one direction for developing a voltage proportional to such movement corresponding to the elevation of the target, means responsive to movement of said manual means in another direction for developing a voltage proportional to such movement corresponding to the bearing of the target, a movable member adapted to be driven to follow a moving target, motive means responsive to said elevation rate voltage for driving said member in elevation, motive means responsive to said bearing rate voltage for driving said member in train, an induction device including a pair of stator windings in space quadrature and a pair of rotor windings in space quadrature inductively associated with said stator windings, several connections between said responsive means and said stator windings for energizing the latter in accordance with said respective voltages, a motor responsive to the voltage induced in one of said rotor coils, operative connections between said motor and said rotor for driving said one rotor coil to zero voltage-inducing position through the apparent target inclination angle $\alpha$, a second motor at least partially responsive to the voltage induced in the other rotor coil for rotating a degree proportional to the angle $\phi$ between the line of sight to the target and a line normal to the path of the target in a plane including the line of sight and the path of the target, a second induction device including a stator winding and a pair of rotor windings in space quadrature, driving connections between said second motor and the rotor of said second induction device for rotating the same a degree proportional to said angle $\phi$, means at least partially responsive to the voltage induced in the other rotor coil of said first induction device for energizing the stator coil of said second induction device, means movable in accordance with the change of range of the target, means responsive to movement of said range means for developing a voltage, means for combining the voltage induced in one of the rotor coils of said second induction device for producing a voltage proportional to the range rate, a third induction device including a stator winding and a pair of rotor windings in space quadrature, operative connections between said first motor, and the rotor of said third induction device for rotating the latter through said angle $\alpha$, connections between the other rotor coil of said second induction device and the stator coil of said third induction device for energizing the latter in accordance with the voltage induced in the former, and means for combining the voltages severally induced in the rotor windings of said third induction device with the corresponding respective voltages developed by said two first-named manually operated voltage means, whereby the movement of said member is adjusted independently of said manual means.

References Cited in the file of this patent

UNITED STATES PATENTS

| | | |
|---|---|---|
| 2,062,110 | Swartmont | Nov. 24, 1936 |
| 2,071,424 | Papello | Feb. 23, 1937 |
| 2,080,186 | Reymond | May 11, 1937 |
| 2,134,901 | Wey | Nov. 1, 1938 |
| 2,414,102 | Hull et al. | Jan. 14, 1947 |

FOREIGN PATENTS

| | | |
|---|---|---|
| 371,517 | Great Britain | Apr. 28, 1932 |
| 511,171 | Great Britain | Oct. 6, 1939 |
| 616,248 | Germany | Aug. 1, 1935 |